(12) United States Patent
Simenec et al.

(10) Patent No.: US 11,347,442 B2
(45) Date of Patent: May 31, 2022

(54) IN-MEMORY DATABASE SERVICE ABSTRACTION COMPONENT

(71) Applicant: SAP SE, Walldorf (DE)

(72) Inventors: Thomas Simenec, Berlin (DE); Martin Reinecke, Blankenfelde-Mahlow (DE)

(73) Assignee: SAP SE, Walldorf (DE)

( * ) Notice: Subject to any disclaimer, the term of this patent is extended or adjusted under 35 U.S.C. 154(b) by 282 days.

(21) Appl. No.: 16/863,813

(22) Filed: Apr. 30, 2020

(65) Prior Publication Data

US 2021/0342087 A1    Nov. 4, 2021

(51) Int. Cl.
*G06F 3/06*    (2006.01)
*G06F 16/25*   (2019.01)

(52) U.S. Cl.
CPC ............ *G06F 3/0665* (2013.01); *G06F 3/062* (2013.01); *G06F 3/0604* (2013.01); *G06F 3/067* (2013.01); *G06F 3/0614* (2013.01); *G06F 3/0632* (2013.01); *G06F 3/0659* (2013.01); *G06F 16/25* (2019.01)

(58) Field of Classification Search
CPC .... G06F 3/0665; G06F 3/0604; G06F 3/0614; G06F 3/062; G06F 3/0632; G06F 3/0659; G06F 3/067; G06F 16/25
USPC .................................................. 707/E17.002
See application file for complete search history.

(56) References Cited

U.S. PATENT DOCUMENTS

| | | | | |
|---|---|---|---|---|
| 6,519,333 B1 * | 2/2003 | Malik | ................... | H04M 7/006 |
| | | | | 379/900 |
| 10,372,887 B2 * | 8/2019 | Sabiwalsky | ......... | G06F 16/2455 |
| 2010/0100525 A1 * | 4/2010 | Huang | ..................... | H04L 67/02 |
| | | | | 707/769 |
| 2015/0268865 A1 * | 9/2015 | Masrani | ................ | G06F 3/0665 |
| | | | | 711/114 |
| 2015/0381725 A1 * | 12/2015 | Haapaoja | ............... | G06F 3/0611 |
| | | | | 709/213 |
| 2019/0034460 A1 * | 1/2019 | Eberlein | ................ | G06F 16/285 |

FOREIGN PATENT DOCUMENTS

CN    108121705 B  *  10/2021  ....... G06F 16/24552

OTHER PUBLICATIONS

English Machine Translation of CN-108121705-B, Google Patents (10 pages) (Year: 2022).*

* cited by examiner

*Primary Examiner* — Wing F Chan
*Assistant Examiner* — Leon Y Tseng
(74) *Attorney, Agent, or Firm* — Schwegman Lundberg & Woessner, P.A.

(57) ABSTRACT

In an example embodiment, a specialized in-memory database abstraction component is introduced in a cloud cluster. The in-memory database abstraction component may receive lifecycle commands from a client-facing application and interface with a container service to create an in-memory database resource. When parameters are received by the in-memory database abstraction component from the client-facing application, the in-memory database abstraction component may act to validate the parameters, determine if a service plan is available, and determine whether the parameters meet the service plan requirements. If the service plan requirements are not met, the in-memory database abstraction component translates the parameters for the in-memory database resource.

20 Claims, 7 Drawing Sheets

IN-MEMORY DATABASE SERVICE ABSTRACTION COMPONENT

TECHNICAL FIELD

This document generally relates to in-memory database technology. More specifically, this document relates to a service trace mining of an in-memory database.

BACKGROUND

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
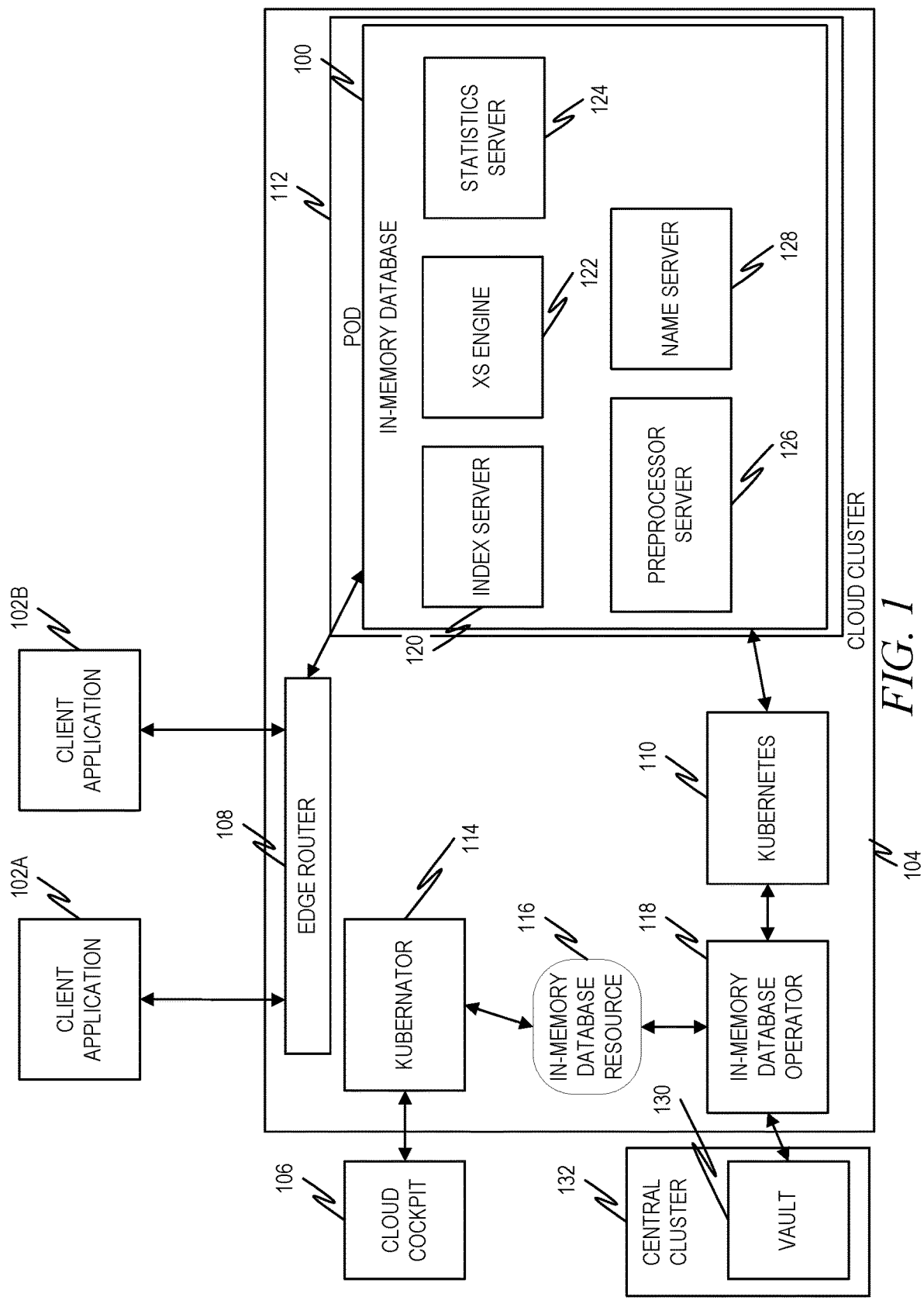
FIG. 1 is a diagram illustrating a cloud-based in-memory database management system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One implementation of in-memory databases is to place them in a cloud and allow access to the cloud database as a service. For the HANA® cloud, this is known as HANA® as a service (HaaS). This allows customers to leverage the in-memory data processing and advanced analytic capabilities in the cloud.

Such services may allow applications to be developed using specialized in-memory database extended application services and deployed to a Cloud Foundry environment. Cloud Foundry is an open source, multi-cloud application platform as a service that allows for continuous delivery as it supports a full application development lifecycle, from initial deployment through testing stages to deployment. Cloud Foundry utilizes a container-based architecture that runs application in any programming language over a variety of cloud service providers.

A customer-facing application is provided as part of an in-memory database in a cloud environment. This customer-facing application allows a customer to request lifecycle actions on the in-memory database, such as database creation, deletion, schema updates, etc. An example of such a customer-facing application is Cloud Cockpit. Cloud Cockpit communicates its lifecycle requests to an in-memory database operator, which is a component located in cloud cluster that operates Kubernetes managed applications and their components to operate an in-memory database. The in-memory database operator then interprets the requests and initiates the underlying database operation.

One technical problem encountered, however, in moving an in-memory database to a cloud is that when it is necessary to alter or update the requirements of the in-memory database, it also become necessary to update the in-memory database operator as well. For example, an instance of an in-memory database may be configured to require byte values in a particular format. Typically the in-memory database operator would receive abstract computing units provided by the customer-facing application and convert them to the concrete byte values required by the in-memory database instance. These requirements are specified by a service broker application program interface (API). If the service broker API changes, this requires a change to the in-memory database operator.

What further complicates this is that it is becoming more common to utilize a containerized implementation of a database, such as by using Kubernetes. Kubernetes is a system for automating deployment, scaling, and management of containerized applications. Application containerization is a virtualization method used by operating systems to deploy and run distributed applications without launching an entire virtual machine for each application.

Containerized applications have advantages over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

Kubernetes container, by virtue of being so modular, are quite conducive to scaling of in-memory database instances. Kubernetes containers are called pods. Each pod is scheduled on a specific host and encapsulates a container for each of one or more applications. If the host becomes unavailable, Kubernetes automatically instantiates the instance on a different host, greatly easing maintenance. If there is a change in the service broker API, or the customer-facing application changes some calculation modes, the underlying in-memory database operator has to be updated, which, which impedes the ability of the system to provide the very scalability that Kubernetes provides.

What is needed is a solution that avoids these technical problems.

In an example embodiment, a specialized in-memory database abstraction component is introduced in a cloud cluster. The in-memory database abstraction component may receive lifecycle commands from a client-facing application and interface with a container service to create an in-memory database resource. When parameters are received by the in-memory database abstraction component from the client-facing application, the in-memory database abstraction component may act to validate the parameters, determine if a service plan is available, and determine whether the parameters meet the service plan requirements. If the service plan requirements are not met, the in-memory database abstraction component translates the parameters for the in-memory database resource.

FIG. 1 is a diagram illustrating a cloud-based in-memory database management system 100, including its client/external connection points, which can be kept stable in the case of disaster recovery to ensure stable service operations, in accordance with an example embodiment. Here, the in-memory database management system 100 may be coupled to one or more client applications 102A, 102B. The client applications 102A, 102B may communicate with the in-memory database management system 100 through a number of different protocols, including Structured Query Language (SQL), Multidimensional Expressions (MDX), Hypertext Transfer Protocol (HTTP), REST, and Hypertext Markup Language (HTML).

The in-memory database 100 may be stored in cloud cluster 104.

Also depicted is a cloud cockpit 106, used to perform lifecycle operations on the in-memory database 100. The one or more client applications 102A, 102B may access the in-memory database system via an edge router 108. On the back end, however, Kubernetes 110 is used to manage the specific instance of the in-memory database, which may be stored in a Kubernetes pod 112 or other container.

An in-memory database pod abstraction component, which may be called "Kubernator" 114 in this disclosure may receive lifecycle commands from the cloud cockpit 106 and interface with Kubernetes 110 to create an in-memory database resource 116. When parameters are received by the Kubernator 114 from the cloud cockpit 106, the Kubernator may act to validate the parameters, determine if a service plan is available, and determine whether the parameters meet the service plan requirements. If the service plan requirements are not met, the Kubernator 114 translates the parameters for the in-memory database resource 116. An in-memory database operator 118 may then create and watch the in-memory database 100 and the Kubernetes pod 112, as well as the in-memory database resource 116. Notably, however, when a service plan (and its corresponding service broker API) changes for a particular Kubernetes pod 112, it is no longer necessary for the in-memory database operator 118 to change.

The in-memory database 100 may comprise a number of different components, including an index server 120, an XS engine 122, a statistics server 124, a preprocessor server 126, and a name server 128. These components may operate on a single computing device, or may be spread among multiple computing devices (e.g., separate servers).

The index server 120 contains the actual data and the engines for processing the data. It also coordinates and uses all the other servers.

The XS engine 122 allows clients to connect to the in-memory database 100 using web protocols, such as HTTP.

The statistics server 124 collects information about status, performance, and resource consumption from all the other server components. The statistics server 124 can be accessed from the cloud cockpit 106 to obtain the status of various alert monitors.

The preprocessor server 126 is used for analyzing text data and extracting the information on which text search capabilities are based.

The name server 128 holds information about the database topology. This is used in a distributed system with instances of the database on different hosts. The name server 128 knows where the components are running and which data is located on which server.

Figure 2:
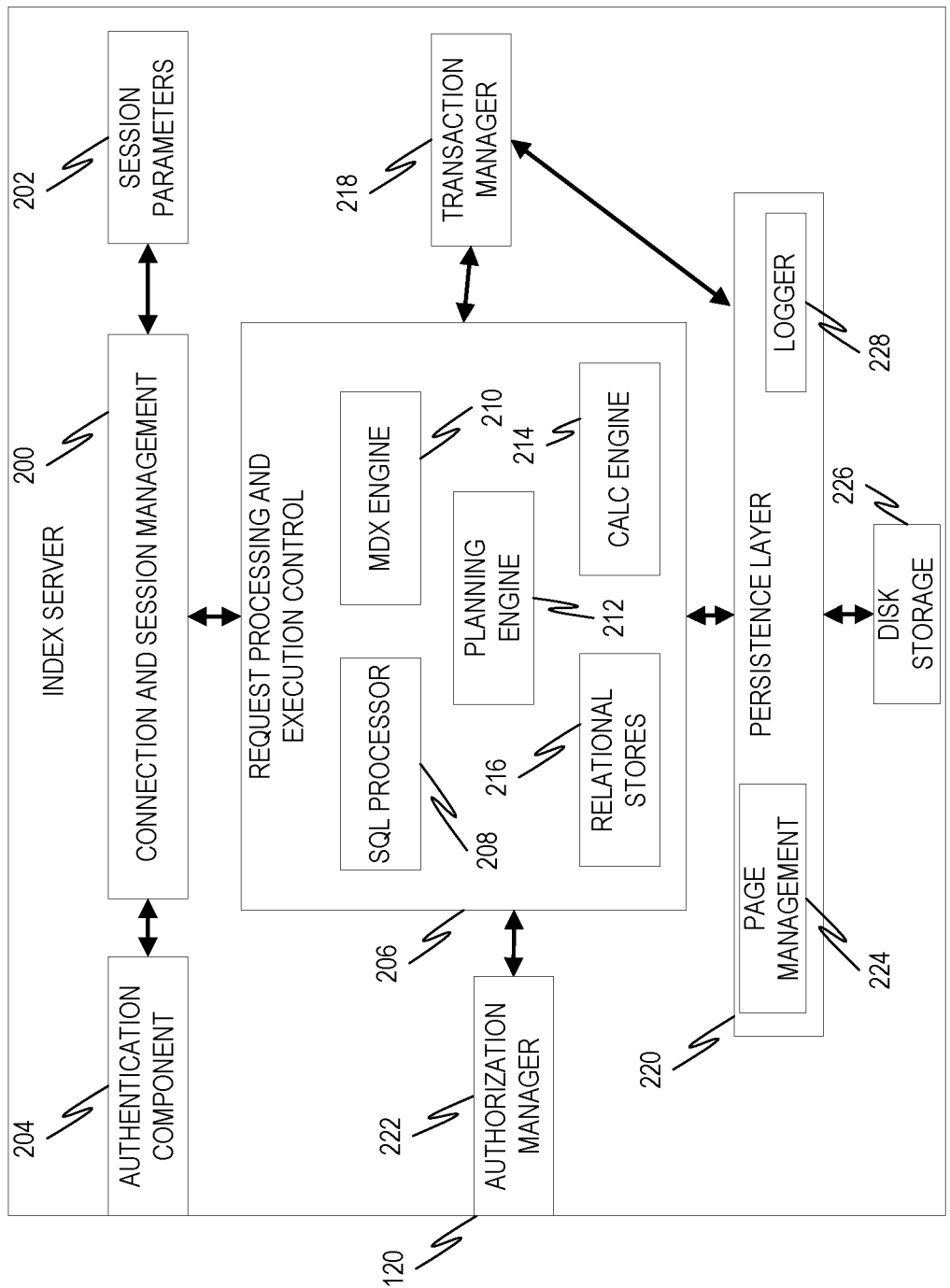
FIG. 2 is a diagram illustrating an index server, in accordance with an example embodiment.

FIG. 2 is a diagram illustrating an index server 120, in accordance with an example embodiment. Specifically, the index server 120 of FIG. 1 is depicted in more detail. The index server 120 includes a connection and session management component 200, which is responsible for creating and managing sessions and connections for the database clients. Once a session is established, clients can communicate with the database system using SQL statements. For each session, a set of session parameters 202 may be maintained, such as auto-commit, current transaction isolation level, etc. Users (e.g., system administrators, developers) may be authenticated by the database system itself (e.g., by logging in with user name and password, using an authentication component 204), or authentication can be delegated to an external authentication provider such as a Lightweight Directory Access Protocol (LDAP) directory.

The client requests can be analyzed and executed by a set of components summarized as request processing and execution control 206. An SQL processor 208 checks the syntax and semantics of the client SQL statements and generates a logical execution plan. Multidimensional expressions (MDX) are a language for querying and manipulating multidimensional data stored in online analytical processing (OLAP) cubes. As such, an MDX engine 210 is provided to allow for the parsing and executing of MDX commands. A planning engine 212 allows applications (e.g., financial planning applications) to execute basic planning operations in the database layer. One such operation is to create a new version of a dataset as a copy of an existing dataset, while applying filters and transformations.

A calc engine 214 implements the various SQL script and planning operations. The calc engine 214 creates a logical execution plan for calculation models derived from SQL scripts, MDX, planning, and domain-specific models. This logical execution plan may include, for example, breaking up a model into operations that can be processed in parallel.

The data is stored in relational stores 216, which implement a relational database in main memory.

Each SQL statement may be processed in the context of a transaction. New sessions are implicitly assigned to a new transaction. A transaction manager 218 coordinates database transactions, controls transactional isolation, and keeps track of running and closed transactions. When a transaction is committed or rolled back, the transaction manager 218 informs the involved engines about this event so they can execute needed actions. The transaction manager 218 also cooperates with a persistence layer 220 to achieve atomic and durable transactions.

An authorization manager 222 is invoked by other database system components to check whether the user has the specified privileges to execute the requested operations. The database system allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to and from a separate disk storage 226, and also contains a logger 228 that manages the transaction log. Log entries can be written implicitly by the persistence layer 220 when data is written via the persistence interface or explicitly by using a log interface.

Figure 3:
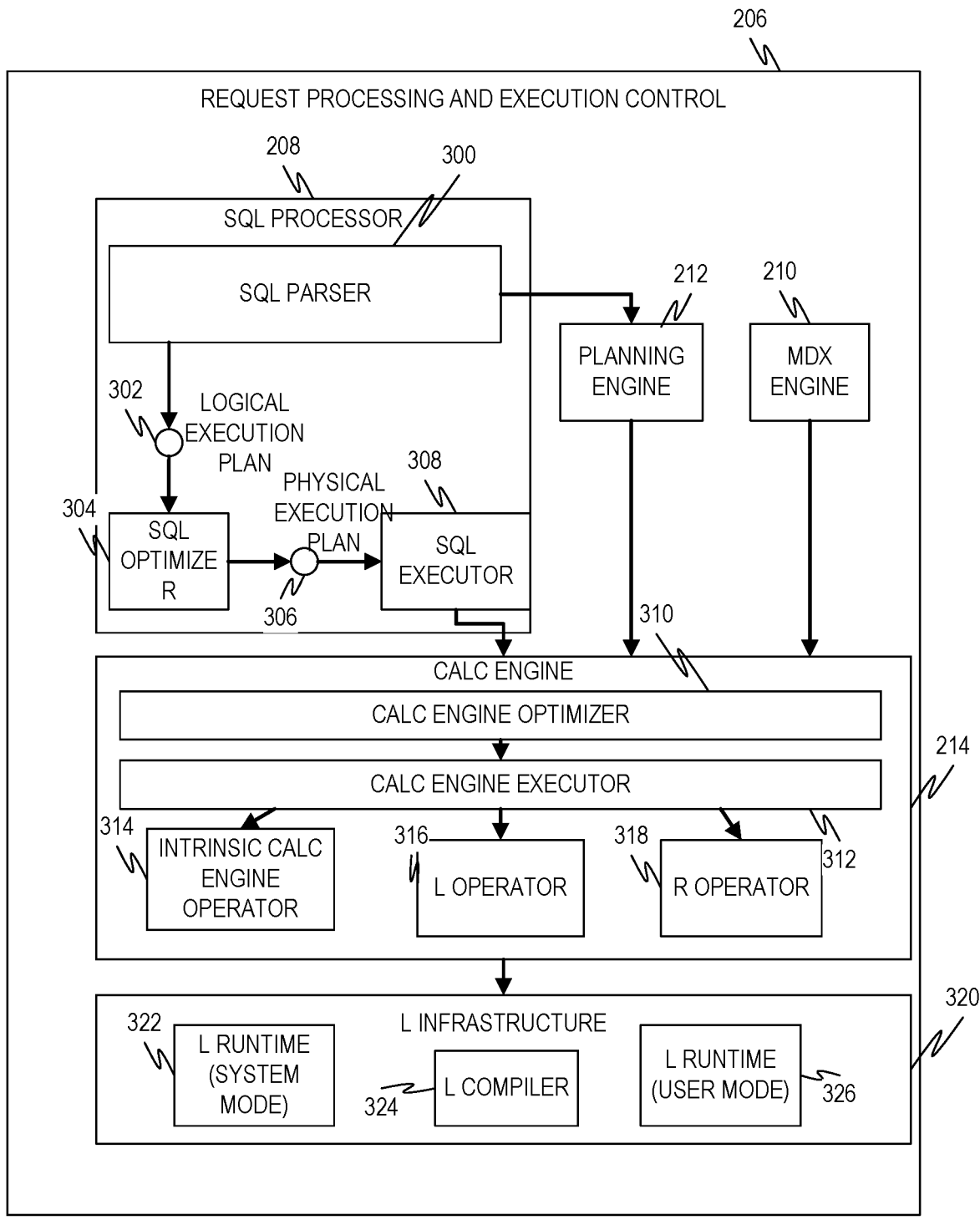
FIG. 3 is a diagram illustrating a request processing and execution control, in accordance with an example embodiment.

FIG. 3 is a diagram illustrating a request processing and execution control 206, in accordance with an example embodiment. This diagram depicts the request processing and execution control 206 of FIG. 2 in more detail. The SQL processor 208 contains an SQL parser 300, which parses an SQL statement and generates a logical execution plan 302, which it passes to an SQL optimizer 304. The SQL optimizer 304 then optimizes the logical execution plan 302 and converts it to a physical execution plan 306, which it then passes to an SQL executor 308. The calc engine 314 implements the various SQL script and planning operations, and includes a calc engine optimizer 310, which optimizes the operations, and a calc engine executor 312, which executes the operations, as well as an intrinsic calc engine operator 314, an L operator 316, and an R operator 318.

An L infrastructure 320 includes a number of components to aid in the running of L procedures, including an L-runtime (system mode) 322, an L compiler 324, and an L-runtime (user mode) 326.

As described earlier, the Kubernator provides an interface between an open service broker API and Kubernetes resources and allows for provisioning and deprovisioning of in-memory database cloud instances by preparing corresponding Kubernetes resources. Furthermore, it also determines the memory of the in-memory database cloud instance, depending on a service plan chosen by a customer.

In some example embodiments, the Kubernator may also perform additional tasks. This may include providing a whitelist specification for an in-memory database cloud instance to be provisioned. It may also create kubernetes backup recovery jobs for an in-memory database cloud instance to be provisioned. It may also check user-supplied passwords for security compliance, check customer quotas according to a chosen plan, and provide a last operation API call to check the provision state while the in-memory database cloud instance is being provisioned.

With respect to passwords, referring back to FIG. 1, in an example embodiment a vault 130 is used, stored in a separate central cluster 132, to secure, story, and tightly control access to tokens, passwords, certificates, and encryption keys for protecting sensitive data in the in-memory database. Changes in password handling, like changes in service broker APIs, now can be handled by changing Kubernator 110 rather than needing to change the in-memory database operator 116.

It should be noted that while a Kubernetes pod 112 is depicted as containing the in-memory database 100, in an example embodiment, the various other components of the cloud cluster 104, such as Kubernator 110, may have their own Kubernetes pods.

Figure 4:
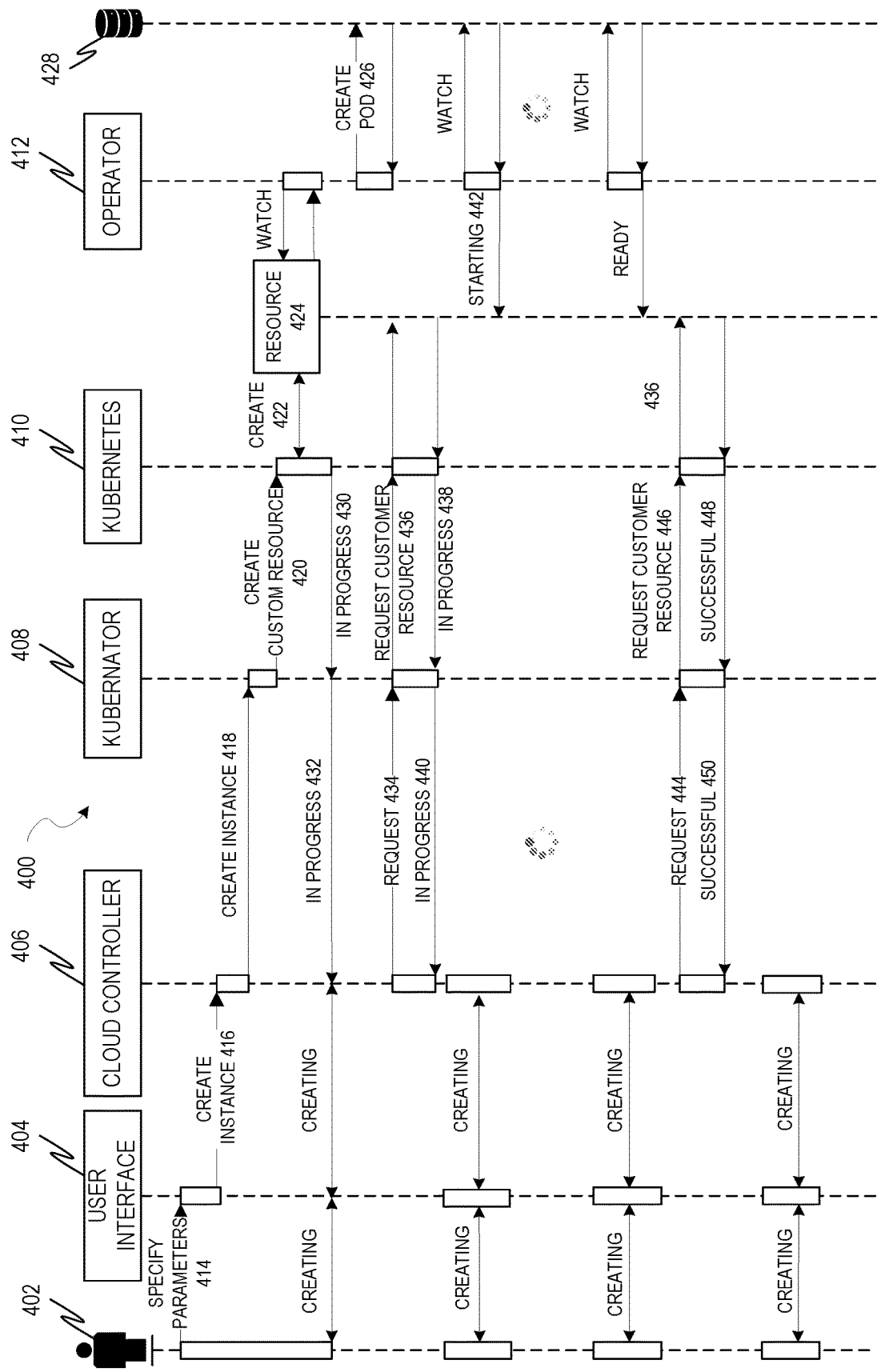
FIG. 4 is a sequence diagram illustrating a method for performing in-memory database request abstraction, in accordance with an example embodiment.

FIG. 4 is a sequence diagram illustrating a method 400 for performing in-memory database request abstraction, in accordance with an example embodiment. The components/entity involved in the method 400 include a user 402, a user interface 404, a cloud controller 406, a kubernator 408, kubernetes 410, and an in-memory database operator 412. At operation 414, the user 402 specifies parameters of an in-memory database lifecycle request to the user interface 404. This request may be a request to create an instance of the in-memory database in a cloud. At operation 416, the user interface 404 causes a create instance command to be directed to the cloud controller 406. In an example embodiment this may be a cloud foundry create instance command.

At operation 418, the cloud controller 406 causes a create instance command to be directed to the kubernator 408. In an example embodiment, this may be an open service broker create instance command. At operation 420, the kubernator 408 requests that kubernetes 410 create a custom resource. This create request may be the result of translating the parameters specified by the user 402 into a format accepted by kubernetes 410. Additionally, these parameters may have been validated by kubernator prior to the request being directed to kubernetes 410. At operation 422, kubernetes 410 create the resource 424.

In-memory database operator 412 acts to watch the resource 422 and, when appropriate, at operation 426, create an in-memory database pod containing the instance of the in-memory database 428. At operation 430, kubernetes 410 may send an in-progress message to the kubernator 408, which at operation 432 sends an in-progress message to a cloud controller 406. The in-progress message indicates that the in-memory database instantiation is still in progress.

At operation 434, an in-memory database operation request may be sent from the cloud controller 406 to the kubernator 408. This request may cause the kubernator 408, at operation 436, to request the custom resource 424 from kubernetes 410, but the underlying in-memory database instance is still being created, so at operation 438, kubernetes 410 informs the kubernator 408 that it is still in-progress, which the kubernator 408 sends to the cloud controller 406 at operation 440. The in-memory database operator 412 watches the in-memory database 418 to determine when it has been completely set up, at which point it may send a starting command, at operation 442, to the resource 424.

Later, at operation 444, when another in-memory database operation request is sent from the cloud controller 406 to the kubernator 408, the kuberator 408 again requests the custom resource 424 from kubernetes 410, at operation 446, which then is able to transmit a successful message to the kubernator 408 at operation 448. The kubernator 408 may then send the successful message to the cloud controller 408 at operation 450.

Figure 5:
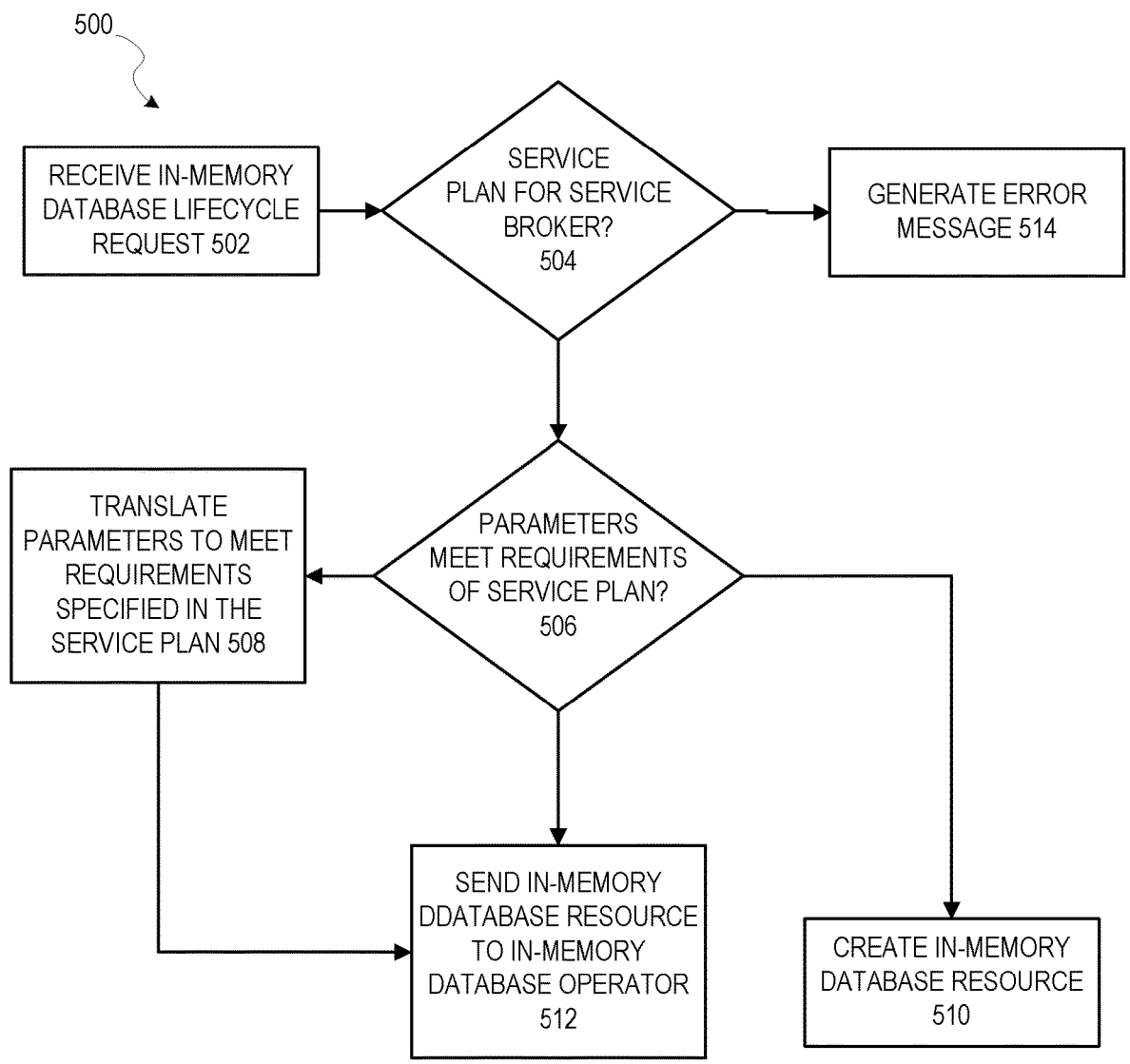
FIG. 5 is a flow diagram illustrating a method for performing in-memory database request abstraction in accordance with an example embodiment.

FIG. 5 is a flow diagram illustrating a method 500 for performing in-memory database request abstraction in accordance with an example embodiment. In an example embodiment, the method 500 may be performed by an in-memory database abstraction component, such as a kubernator. At operation 502, an in-memory database lifecycle request is received. This request may include one or more parameters. At operation 504, it is determined if a service plan of a service broker is available. If so, then at operation 506 it is determined if the parameters meet requirements specified in the service plan. If not, then at operation 508, the parameters are translated to meet the requirements specified in the service plan. Then, or if it was determined at operation 506 that the parameters did meet the requirements specified in the service plan, at operation 510 an in-memory database resource is created.

At operation 510, the in-memory database resource is sent to an in-memory database operator to perform Kubernetes commands using the parameters in the in-memory database resource.

If at operation 504 it was determined that no service plan of a service broker is available, then at operation 512 an error message is generated.

EXAMPLES

Example 1. A system comprising:
- at least one hardware processor; and
- a computer-readable medium storing instructions that, when executed by the at least one hardware processor, cause the at least one hardware processor to perform operations comprising:
- receiving an in-memory database lifecycle request, the in-memory database lifecycle request including one or more parameters;
- determining if a service plan exists for a service broker associated with the in-memory database lifecycle request;
- in response to a determination that service plan exists for a service broker associated with the in-memory database lifecycle request, determining if the one or more parameters meet one or more requirements specified in the service plan;
- in response to a determination that the one or more parameters do not meet one or more requirements specified in the service plan, translating the one or more parameters to meet the one or more requirements;
- forming an in-memory database resource having the translated one or more parameters; and
- sending the in-memory database resource to an in-memory database operator to perform an in-memory database lifecycle action using a container service.

Example 2. The system of Example 1, wherein the in-memory database lifecycle action is an instantiation of an in-memory database.

Example 3. The system of Examples 1 or 2, wherein the container service is Kubernetes.

Example 4. The system of any of Examples 1-2, wherein the operations are performed by an in-memory database abstraction component.

Example 5. The system of Example 4, further comprising:
- upon receiving a change to the one or more requirements specified in the service plan, updating the in-memory database abstraction component without altering the in-memory database operator.

Example 6. The system of Example 4, wherein the in-memory database lifecycle action is security-related.

Example 7. The system of Example 6, wherein a vault stored in a separate cluster than a cluster containing the in-memory database abstraction component stores security-related information.

Example 8. A method comprising:
- receiving an in-memory database lifecycle request, the in-memory database lifecycle request including one or more parameters;
- determining if a service plan exists for a service broker associated with the in-memory database lifecycle request;
- in response to a determination that service plan exists for a service broker associated with the in-memory database lifecycle request, determining if the one or more parameters meet one or more requirements specified in the service plan;
- in response to a determination that the one or more parameters do not meet one or more requirements specified in the service plan, translating the one or more parameters to meet the one or more requirements;
- forming an in-memory database resource having the translated one or more parameters; and
- sending the in-memory database resource to an in-memory database operator to perform an in-memory database lifecycle action using a container service.

Example 9. The method of Example 8, wherein the in-memory database lifecycle action is an instantiation of an in-memory database.

Example 10. The method of Example 8 or 9, wherein the container service is Kubernetes.

Example 11. The method of any of Examples 8-10, wherein the operations are performed by an in-memory database abstraction component.

Example 12. The method of Example 11, further comprising:
- upon receiving a change to the one or more requirements specified in the service plan, updating the in-memory database abstraction component without altering the in-memory database operator.

Example 13. The method of Example 11, wherein the in-memory database lifecycle action is security-related.

Example 14. The method of Example 13, wherein a vault stored in a separate cluster than a cluster containing the in-memory database abstraction component stores security-related information.

Example 15. A non-transitory machine-readable medium storing instructions which, when executed by one or more processors, cause the one or more processors to perform operations comprising:
- receiving an in-memory database lifecycle request, the in-memory database lifecycle request including one or more parameters;
- determining if a service plan exists for a service broker associated with the in-memory database lifecycle request;
- in response to a determination that service plan exists for a service broker associated with the in-memory database lifecycle request, determining if the one or more parameters meet one or more requirements specified in the service plan;
- in response to a determination that the one or more parameters do not meet one or more requirements specified in the service plan, translating the one or more parameters to meet the one or more requirements;
- forming an in-memory database resource having the translated one or more parameters; and
- sending the in-memory database resource to an in-memory database operator to perform an in-memory database lifecycle action using a container service.

Example 16. The non-transitory machine-readable medium of Example 15, wherein the in-memory database lifecycle action is an instantiation of an in-memory database.

Example 17. The non-transitory machine-readable medium of Examples 15 or 16, wherein the container service is Kubernetes.

Example 18. The non-transitory machine-readable medium of Examples 15-17, wherein the operations are performed by an in-memory database abstraction component.

Example 19. The non-transitory machine-readable medium of Example 18, further comprising:
upon receiving a change to the one or more requirements specified in the service plan, updating the in-memory database abstraction component without altering the in-memory database operator.

Example 20. The non-transitory machine-readable medium of Example 18, wherein the in-memory database lifecycle action is security-related.

Figure 6:
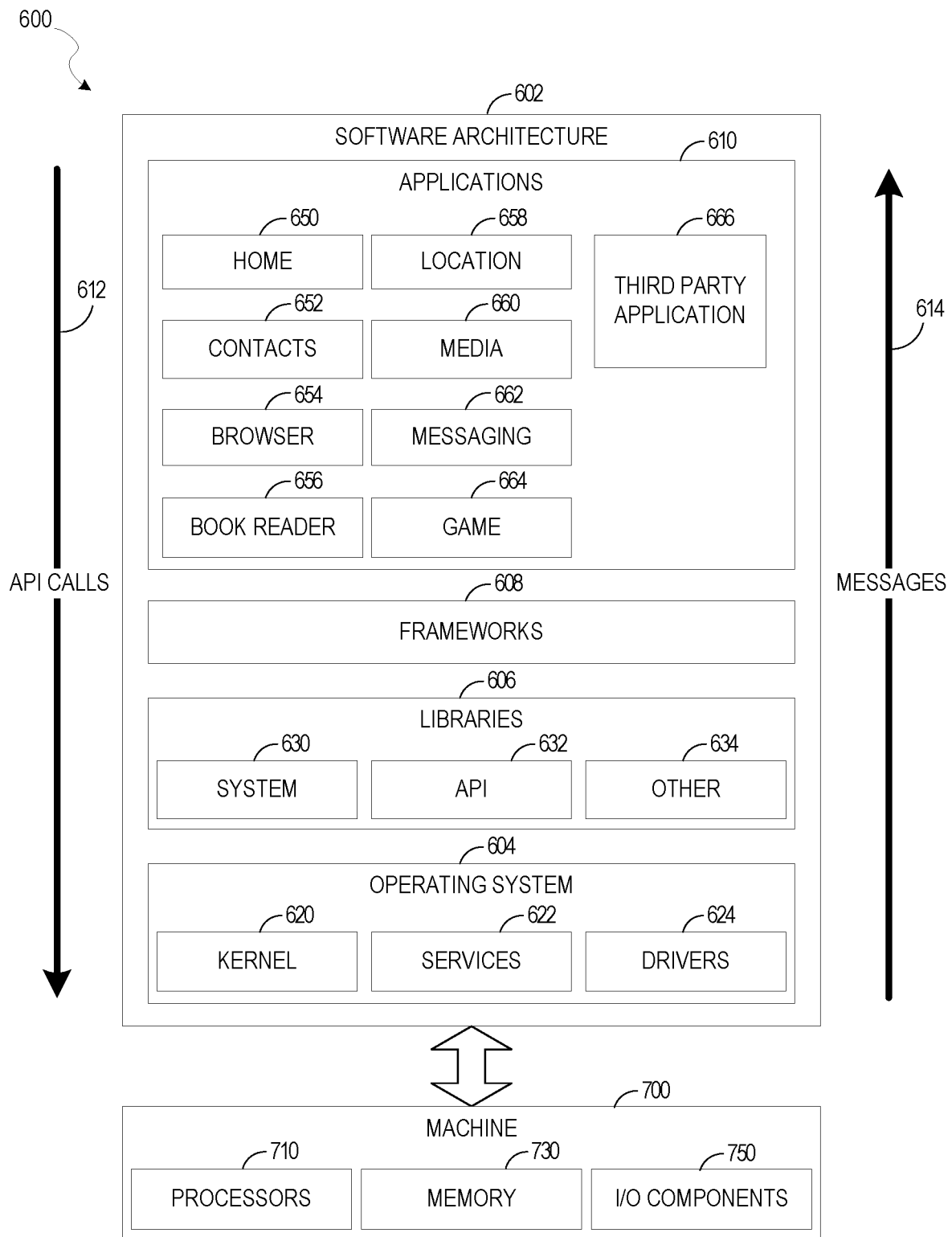
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
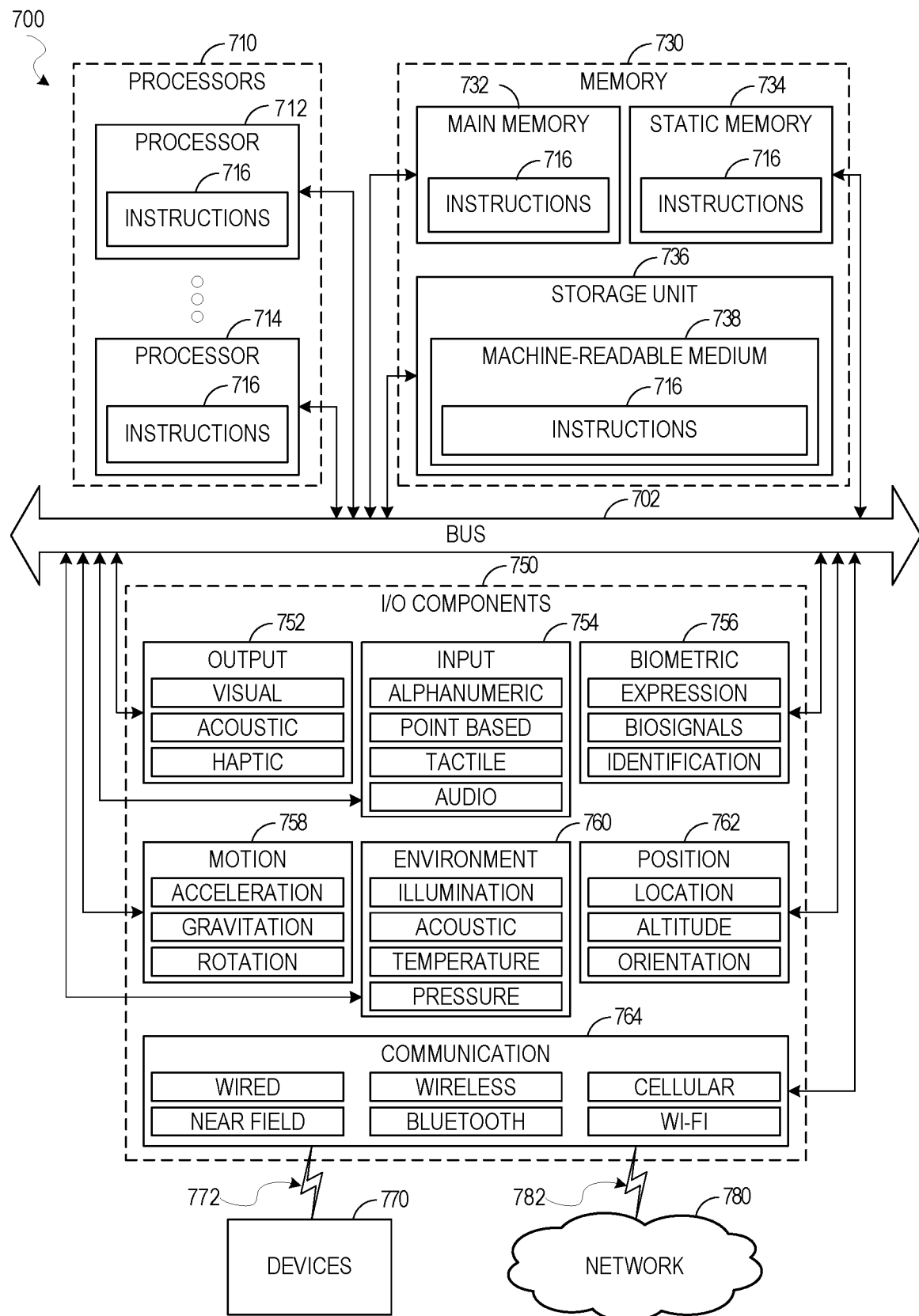
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the methods of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving an in-memory database lifecycle request, the in-memory database lifecycle request including one or more parameters;
   determining if a service plan exists for a service broker associated with the in-memory database lifecycle request;
   in response to a determination that service plan exists for a service broker associated with the in-memory database lifecycle request, determining if the one or more parameters meet one or more requirements specified in the service plan;
   in response to a determination that the one or more parameters do not meet one or more requirements specified in the service plan, translating the one or more parameters to meet the one or more requirements;
   forming an in-memory database resource having the translated one or more parameters; and
   sending the in-memory database resource to an in-memory database operator to perform an in-memory database lifecycle action using a container service.

2. The system of claim 1, wherein the in-memory database lifecycle action is an instantiation of an in-memory database.

3. The system of claim 1, wherein the container service is a system for automating deployment, scaling, and management of containerized applications.

4. The system of claim 1, wherein the operations are performed by an in-memory database abstraction component.

5. The system of claim 4, further comprising:
   upon receiving a change to the one or more requirements specified in the service plan, updating the in-memory database abstraction component without altering the in-memory database operator.

6. The system of claim 4, wherein the in-memory database lifecycle action is security-related.

7. The system of claim 6, wherein a vault stored in a separate cluster than a cluster containing the in-memory database abstraction component stores security-related information.

8. A method comprising:
receiving an in-memory database lifecycle request, the in-memory database lifecycle request including one or more parameters;
determining if a service plan exists for a service broker associated with the in-memory database lifecycle request;
in response to a determination that service plan exists for a service broker associated with the in-memory database lifecycle request, determining if the one or more parameters meet one or more requirements specified in the service plan;
in response to a determination that the one or more parameters do not meet one or more requirements specified in the service plan, translating the one or more parameters to meet the one or more requirements;
forming an in-memory database resource having the translated one or more parameters; and
sending the in-memory database resource to an in-memory database operator to perform an in-memory database lifecycle action using a container service.

9. The method of claim 8, wherein the in-memory database lifecycle action is an instantiation of an in-memory database.

10. The method of claim 8, wherein the container service is a system for automating deployment, scaling, and management of containerized applications.

11. The method of claim 8, wherein the operations are performed by an in-memory database abstraction component.

12. The method of claim 11, further comprising:
upon receiving a change to the one or more requirements specified in the service plan, updating the in-memory database abstraction component without altering the in-memory database operator.

13. The method of claim 11, wherein the in-memory database lifecycle action is security-related.

14. The method of claim 13, wherein a vault stored in a separate cluster than a cluster containing the in-memory database abstraction component stores security-related information.

15. A non-transitory machine-readable medium storing instructions which, when executed by one or more processors, cause the one or more processors to perform operations comprising:
receiving an in-memory database lifecycle request, the in-memory database lifecycle request including one or more parameters;
determining if a service plan exists for a service broker associated with the in-memory database lifecycle request;
in response to a determination that service plan exists for a service broker associated with the in-memory database lifecycle request, determining if the one or more parameters meet one or more requirements specified in the service plan;
in response to a determination that the one or more parameters do not meet one or more requirements specified in the service plan, translating the one or more parameters to meet the one or more requirements;
forming an in-memory database resource having the translated one or more parameters; and
sending the in-memory database resource to an in-memory database operator to perform an in-memory database lifecycle action using a container service.

16. The non-transitory machine-readable medium of claim 15, wherein the in-memory database lifecycle action is an instantiation of an in-memory database.

17. The non-transitory machine-readable medium of claim 15, wherein the container service is a system for automating deployment, scaling, and management of containerized applications.

18. The non-transitory machine-readable medium of claim 15, wherein the operations are performed by an in-memory database abstraction component.

19. The non-transitory machine-readable medium of claim 18, further comprising:
upon receiving a change to the one or more requirements specified in the service plan, updating the in-memory database abstraction component without altering the in-memory database operator.

20. The non-transitory machine-readable medium of claim 18, wherein the in-memory database lifecycle action is security-related.

\* \* \* \* \*